(12) United States Patent
Knight

(10) Patent No.: US 7,880,665 B1
(45) Date of Patent: Feb. 1, 2011

(54) SYSTEM AND METHOD FOR ADAPTATION OF A RADAR RECEIVER IN RESPONSE TO FREQUENCY DRIFT IN A TRANSMISSION SOURCE

(75) Inventor: Michael B. Knight, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 162 days.

(21) Appl. No.: 12/393,370

(22) Filed: Feb. 26, 2009

Related U.S. Application Data

(60) Provisional application No. 61/032,472, filed on Feb. 29, 2008, provisional application No. 61/052,476, filed on May 12, 2008.

(51) Int. Cl.
*G01S 13/95* (2006.01)
*G01S 7/40* (2006.01)

(52) U.S. Cl. .................. 342/26 R; 342/83; 342/100; 342/174; 342/194

(58) Field of Classification Search ............. 342/26 R, 342/26 A–26 D, 82–89, 98–100, 174, 194
See application file for complete search history.

(56) References Cited

U.S. PATENT DOCUMENTS

| | | | | |
|---|---|---|---|---|
| 6,646,587 B2 * | 11/2003 | Funai | ...................... | 342/26 R |
| 7,405,693 B2 * | 7/2008 | Alford et al. | ............... | 342/26 R |
| 7,439,899 B2 * | 10/2008 | Stagliano et al. | ........... | 342/26 R |
| 7,551,123 B2 * | 6/2009 | Stagliano et al. | ............. | 342/188 |
| 7,760,129 B1 * | 7/2010 | Knight | ...................... | 342/26 D |
| 2009/0174596 A1 * | 7/2009 | Gekat | ........................ | 342/26 R |
| 2010/0090886 A1 * | 4/2010 | Beasley | ...................... | 342/200 |

OTHER PUBLICATIONS

Guo Zai-hua; Xie Ming-yuan; , "Dual-Polarized Signal Processing for Weather Radar," Radar, 2006. CIE '06. International Conference on , vol., no., pp. 1-4, Oct. 16-19, 2006.*

* cited by examiner

*Primary Examiner*—John B Sotomayor
(74) *Attorney, Agent, or Firm*—Russell Carter Gache; Maynard Cooper & Gale, PC

(57) ABSTRACT

A system and method for adaptation of a radar receiver in response to frequency drift in a transmission source is disclosed that utilizes a stable local oscillator established at a single, non-fluctuating frequency and compensates for transmission frequency fluctuation in the signal processor module. The disclosed system and method use mathematical processing techniques to compensate for variations in transmitter frequency during baseband processing of radar reflectivity signals. The system estimates the frequency of the transmitter to a high degree of accuracy and mathematically converts the reflectivity signal energy to a baseband intermediate frequency which is adjusted to compensate for fluctuations in transmitter frequency. A digital down converter circuit and numerically controlled oscillator circuit are also utilized to convert reflectivity signal energy to baseband and compensate for transmitter frequency drift. These new systems allow the stable local oscillator frequency to remain constant and thereby increase receiver stability.

25 Claims, 4 Drawing Sheets

SYSTEM AND METHOD FOR ADAPTATION OF A RADAR RECEIVER IN RESPONSE TO FREQUENCY DRIFT IN A TRANSMISSION SOURCE

This application claims the benefit of filing priority under 35 U.S.C. §119 and 37 C.F.R. §1.78 from U.S. Provisional Application Ser. No. 61/032,472 filed Feb. 29, 2008, for a Method for Adaptation of a Radar Receiver in Response to Modulation Drift in a Transmission Source and U.S. Provisional Application Ser. No. 61/052,476 filed May 12, 2008, for a Method for Adaptation of a Radar Receiver in Response to Frequency Drift in a Transmission Source. All information disclosed in those prior applications are incorporated herein by reference.

FIELD OF THE INVENTION

The present invention relates generally to radar transceivers. In particular, the invention relates to systems and methods for compensating for frequency drift of a radar transmission source. In greater particularity, the present invention relates to systems and methods for compensating for drift in intermediate frequency signals in a radar receiver caused by fluctuations in the frequency of a radar transmission source.

BACKGROUND OF THE INVENTION

Referring to FIG. 1 current Doppler radar systems 5 generally employ a transmitter emitting from radio frequency sources such as a magnetron or other acceptable radio frequency source utilized in Doppler radar systems. Radio frequency signals from transmitter 10 are transmitted to Doppler radar antenna 13 via various couplers 11 and passing through circulators 12 that protect receiver components housed in typical receiver enclosure 16. In some instances, slip rings and pedestal hub conduits 9 are required for transmissions and communications to be transmitted from the transmitter 10 to the radio frequency enclosure 16. Cross-guide coupler 11 also provides a low level sample of the transmitter burst frequency that is propagated to mixer 29. Essentially, cross-guide coupler 11 serves as a signal "tap" to allow for extraction of the transmission burst signal. Essentially, also, a sample of the transmitter frequency is taken.

A transmitter receiver limiter 14 provides additional protection functions to the receiver enclosure 16 and, in conjunction with circulator 12, provides full protection for the receiver 16 from being overwhelmed by transmissions from transmitter 10. Ethernet hub/switch 23 also provides a communications function to allow receiver 16, and its components installed therein, to be able to communicate outside of the radar system 5 and for communications with the antenna, transmitter, and other radar components that may be outside of the radio frequency receiver enclosure 16. Receiver enclosure 16 includes electronic mixing component 17, intermediate frequency digitization (i.e. conversion from analog to digital and vice versa) and associated power supply functions 21, and signal processing module 18. Ethernet hub/switch 23 may or may not be within radio frequency enclosure 16.

Test signal generator 51 provides a known test signal at a known frequency to be utilized within internal receiver components 17 for testing purposes. Radio frequency switch 24 allows for test signals generated by test signal generator 51 to be propagated through other components, as desired, as opposed to the nominal propagation of reflectivity signals to receiver 16. Low noise amplifier 27 amplifies reflectivity signals propagated through RF switch 24 and selectively filtered through filter/isolators 28 into mixer 37. Filters 28 typically operate in the GHz range of frequencies, but signals entering mixer 37 from filter 28 are mixed with stable local oscillator 36 to generate a mixed signal into bandpass filter 38 at an intermediate frequency. Bandpass filter 38 allows passage of signals within the 60 MHz range, which are then amplified by intermediate frequency amplifier 41 and attenuated at 42. Attenuator 42 is necessary in order to obtain correct power and frequency levels in order for intermediate frequency digitization in component 46 so that signal processing module 18 may process those digitized signals.

In addition to processing Doppler reflectivity signals, signal processing module 18 controls, via Ethernet hub/switch 23, the initiation of a firing sequence from transmitter 10. However, radio waves created by transmitter 10 are transmitted at a frequency largely dependent upon the physical dimensions and ancillary electronics powering the transmitter 10. For example, a resonant cavity magnetron transmitter produces transmission signals for propagation outside of radar system 5 via antenna 13 to produce reflectivity data. Firing signals, usually based upon a local oscillator and associated electronics, control its operation. But, depending upon the physical dimensions of the magnetron unit, outputs typically vary by a few percent in their frequency output, depending upon temperature and other environmental factors. As the frequency from transmitter 10 varies, a digital signal processor 20 of module 18 measures the transmitter frequency based upon inputs from variable attenuator 34. Elements 31, 33 and 34 all receive mixed intermediate frequency signals via mixer 29 based upon signal inputs from cross-guide coupler 11 and then pass those signals to digitizer 46. As digital signal processor 20 receives those signals, it processes and analyzes the frequency of transmitter 10.

Conventionally, as signal processing module 18 encounters frequency variations from transmitter 10, it sends analog or digital signals, depending upon the type of STALO 36 designed into system 16, to STALO 36 via RS-232 (or equivalent) feedback path 53 in order to alter the STALO 36 output to compensate for transmission frequency variance and for re-aligning the intermediate frequency entering digitizer 46 to keep intermediate frequency at 60 MHz. Digital STALO 36 typically incorporates external controls to allow for variance in the digital STALO output to mixers 29 and 37. Essentially, the magnetron 10 output signal is sampled at coupler 11 and synchronized with the receiver 16 to whatever frequency the source 10 is generating.

To measure the slight change in the IF signal frequency to process the signal for radar reflectivity data, the IF signal is typically first shifted downward in frequency to near zero frequency (often referred to as "base-band processing"), by mixing with another frequency-stable signal (referred commonly as the "COHO", for "coherent oscillator"). The frequency of the COHO is normally adjusted, by phase-locking or other means, to convert the IF frequency resulting from a stationary target to a frequency of exactly zero Hz. The frequency conversion to base-band may be accomplished by mixing the IF signal with the COHO oscillator, to produce a complex zero-IF signal (analog I and Q processing), or, in more modern "digital" receivers, by digitizing the IF signal directly (using a stable digitizing clock effectively as the COHO) and then using mathematical techniques to shift the center frequency of the digitized signal to a zero-frequency base-band IF.

The accuracy and stability of the two frequency conversion steps, first the conversion to an IF and then the conversion to a base-band, are highly critical to the technical performance of the Doppler weather radar. If the frequency or phase of either the STALO or COHO fluctuates during the reception period, or from one transmitter pulse to the next, phase errors are introduced into the digitized base-band signal for all types of receivers, whether analog I/Q receivers or digital receivers. These phase errors have the effect of spreading the spectrum of the received signal over the pass-band of the receiver (usually defined by the Nyquist interval appropriate to the sampling rate of the measurement, which in most cases is equal to the radar pulse rate). While these errors may affect the accuracy of the Doppler relative velocity measurement, more importantly they adversely affect the ability of the radar to discriminate between precipitation signals and signals reflected from ground targets (called "clutter", from the effect that persistent ground reflections have in masking the observation of weaker signal returns from precipitation).

This baseband processing procedure is relatively straightforward for fixed-frequency transmitters, such as Klystrons, as modern means are available for generating fixed-frequency oscillations of the required stability. However, compensation of transmitter signals for the most common microwave weather radar transmitter tube, the magnetron, is problematic. The difficulty results because the frequency generated by a magnetron is not closely controlled, but is subject to both short-term and long-term frequency changes as the tube temperature, the applied voltage, the nearby magnetic field, or other physical parameters change with time. Thus magnetron radar systems must be designed to provide means for tracking the magnetron frequency changes, and for altering the conversion oscillators accordingly, to keep the received signal well within the receiver pass-band.

Commonly used techniques for altering the digital STALO 36 frequency, namely changing the parameters controlling the synthesizer or phase-lock loop, produce instabilities in frequency and phase of the STALO 36 for a period of time dependant upon the dynamics of the STALO control loop, or the COHO, or both. But, these instabilities have exactly the same negative effects on the performance of the Doppler radar system as compared with the instabilities in the transmitter frequency of a magnetron, and hence the ability of the radar system to discriminate against clutter targets is seriously degraded during the period when the STALO 36 is being altered from one frequency to another.

Fortunately, as digital STALO technology has increased to allow for much higher precision in digital isolation outputs as well as improved stable oscillator operation by providing precision inputs to transmitter 10, and upon the tuning of coherency in those oscillators, receivers 16 now have the ability to be much more stable during reception and analysis of reflectivity signals reflecting back from objects of interest received by antenna 13. However, in order to take full advantage of this increased receiver stability, it is necessary that the STALO frequency remain constant and not be varied to track the transmitter frequency drift.

Therefore what is needed is a system and method to obviate variations in a digital STALO's operation for a radar receiver so that continuous stability of a pre-determined frequency as can now be provided to a radar receiver may be incorporated and adjustments to compensate for fluctuations in the transmitter frequency may be accomplished using mathematical processing techniques to compensate for variation in transmitter frequency during baseband processing of radar reflectivity signals.

SUMMARY OF THE INVENTION

In summary the system and method use mathematical processing techniques to compensate for variations in transmitter frequency during baseband processing of radar reflectivity signals. In particular, the system estimates to a high degree of accuracy the frequency of the transmitter and mathematically processes the received intermediate frequency to keep the transmitter intermediate frequency within a specified receiver pass-band range. The STALO is not varied, but held at a single, non-fluctuating frequency. Then, a mathematical equivalent of a digital COHO is effected in the digital receiver by the mathematical conversion of the reflectivity signal energy to a base-band intermediate frequency which is adjusted to compensate for transmitter frequency drift.

BRIEF DESCRIPTION OF THE DRAWINGS

A system and method for adaptation of a radar receiver in response to frequency drift in a transmission source incorporating the features of the invention are depicted in the attached drawings which form a portion of the disclosure and wherein.

DESCRIPTION OF THE PREFERRED EMBODIMENTS

Figure 1:
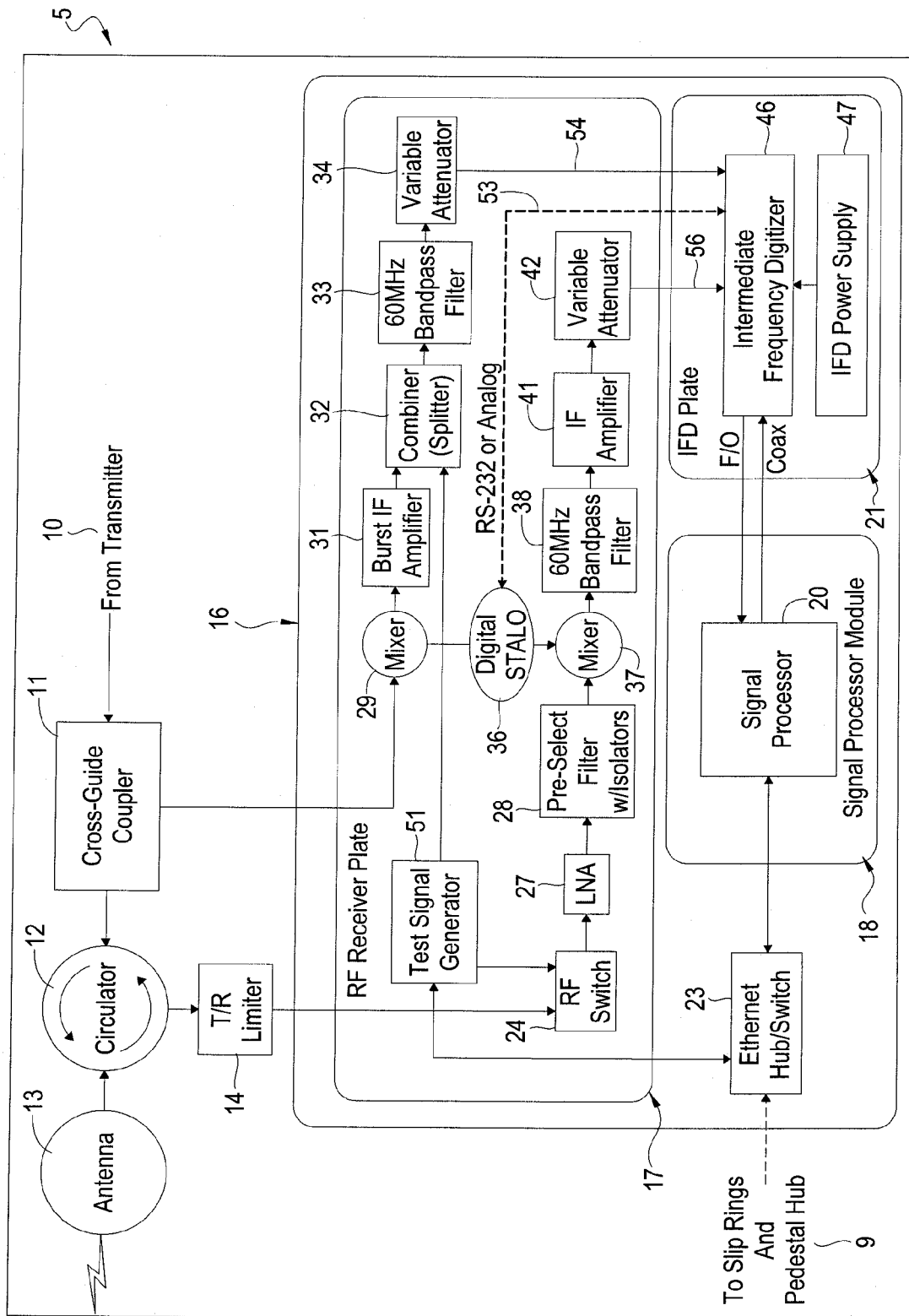
FIG. 1 shows a nominal radar receiver as configured within nominal receiving and transmission components of a Doppler radar and wherein the STALO is varied via a feedback signal.
Figure 2:
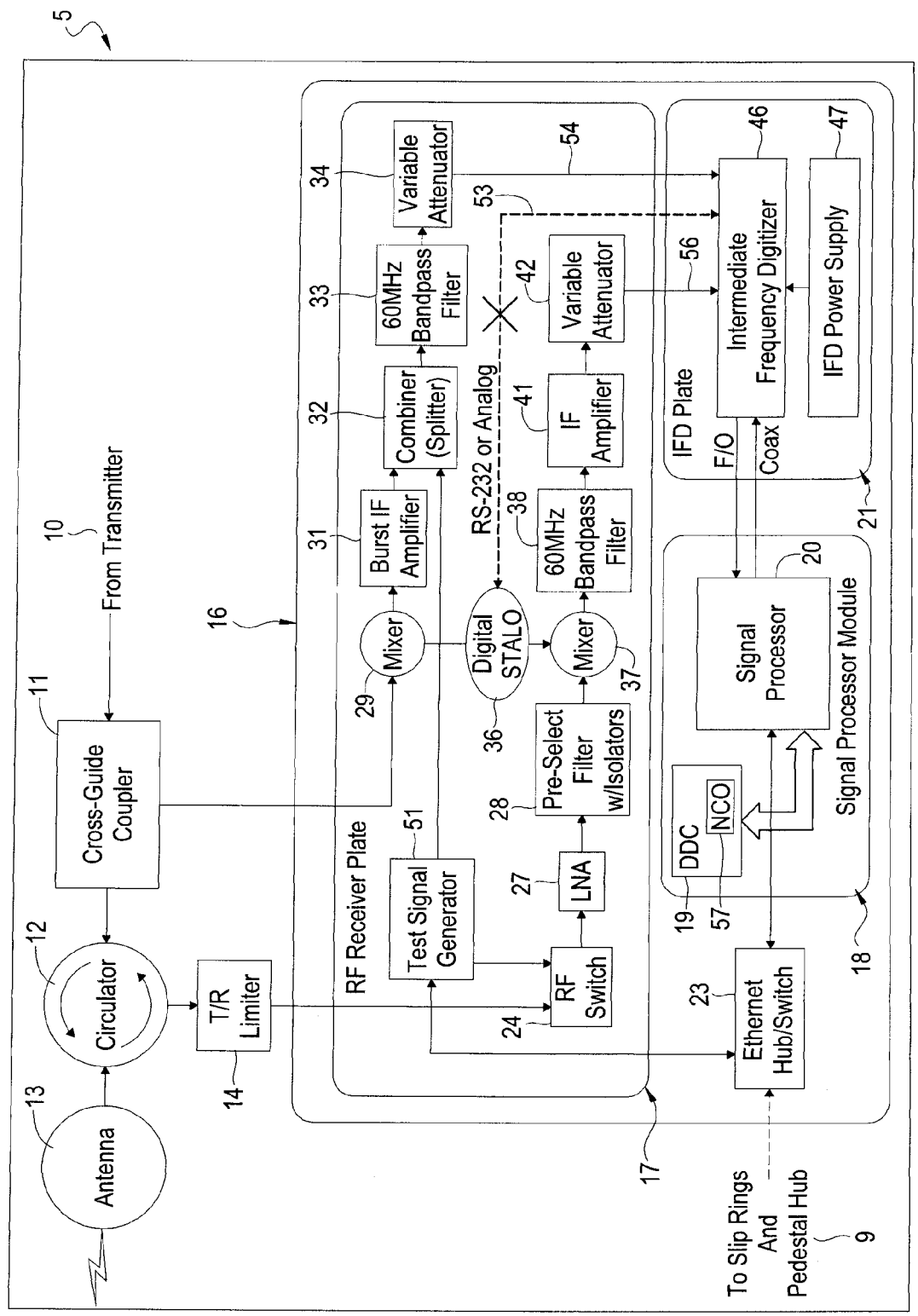
FIG. 2 shows improvements in the communication path between a signal processor and a digital STALO within a receiver enclosure to allow for the dispensing of a feedback signal to a digital STALO based upon signal processing variations and a digital down converter integrated circuit for compensating for variations in transmitter frequency during baseband processing of radar reflectivity signals.

Referring to FIGS. 1 and 2 where like portions share like numbering, and in particular with reference to FIG. 2, feedback path 53 is eliminated in the preferred embodiment of the present invention and signal processor module 18 includes a DDC 19 which includes an NCO circuit 57. Analog to Digital Converter ("DAC") 46 is configured to satisfactorily digitize input signals from circulator path 12-42 (referred to hereinafter as signal 56), and transmitter path 10-34 (referred to hereinafter as signal 54). Processing module 18 consists of a digital signal processor ("DSP") 20 such as Analog Devices ADSP-21160 and a DDC integrated circuit 19 such as GC4016 (multi-standard quad) made by Graychip, Inc. (now owned by Texas Instruments, Inc.). As transmitter 10, a tuned magnetron, fluctuates in its generation frequency, signal processing module 18 measures fluctuations in that frequency in response to a digitized intermediate frequency provided by intermediate frequency digitizer 46. Specifically, the DSP 20 uses known Fast Fourier Transforms ("FFT") techniques to calculate the frequency of transmitter signal 54. The processor 20, rather than adjust the Digital STALO 36 via feedback path 53 to compensate for fluctuations in the frequency of transmitter 10, adjusts in real time NCO 57 to maintain a 60 MHz bandwidth of data for processor 20 to utilize in making its radar calculations.

Figure 3:
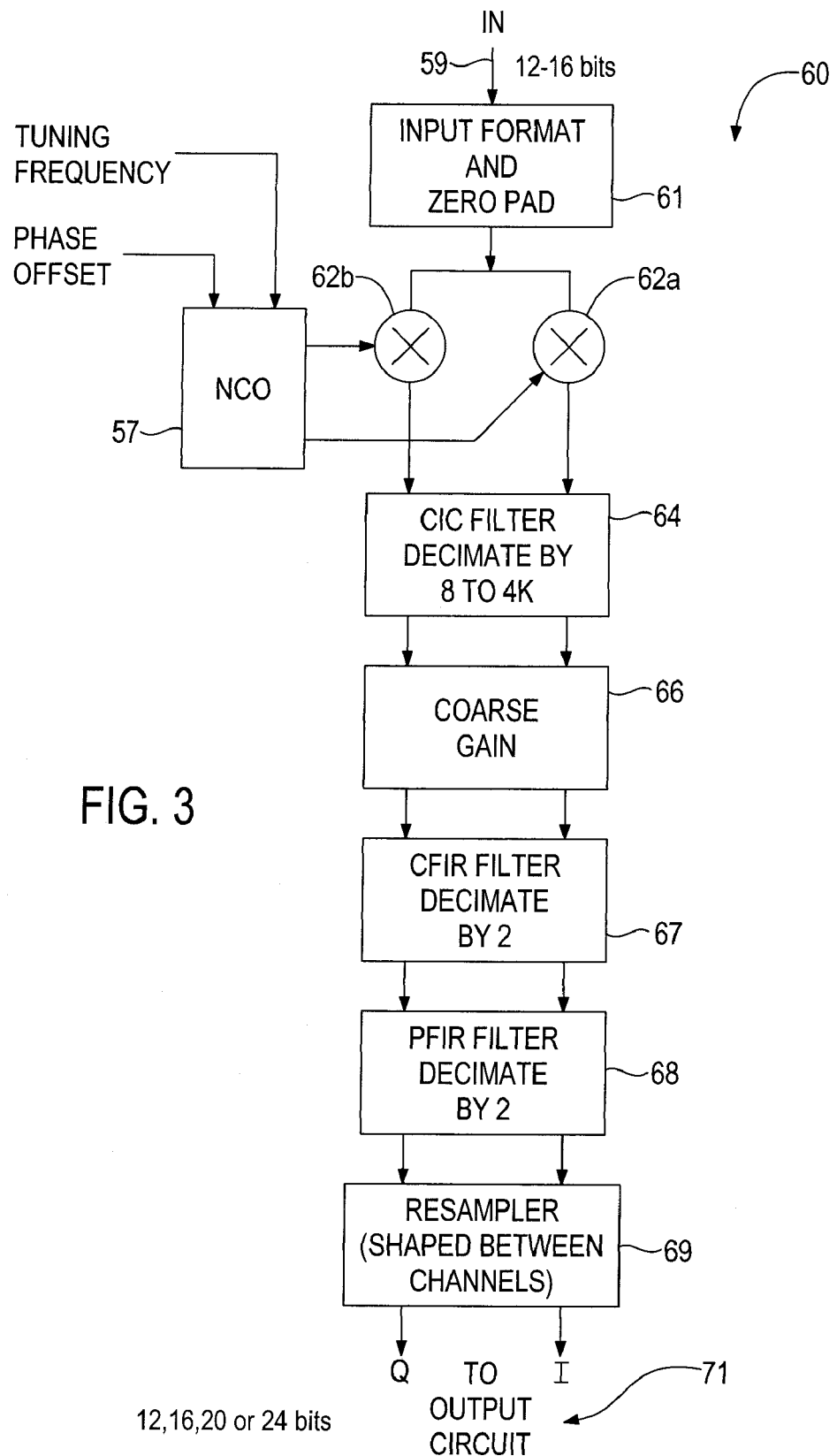
FIG. 3 shows a functional block diagram of one of four down converter channels in a standard off the shelf Digital Down Converter ("DDC") integrated circuit; and, FIG. 4 shows a functional block diagram of a satisfactory Numerically Controlled Oscillator ("NCO") circuit utilized in the DDC channel shown in FIG. 3.

Referring now to FIG. 3, it may be seen that the operation of the DDC chip 19 in module 18 is to effect the base band processing (down conversion of the intermediate frequency containing the radar reflectivity signals to zero utilizing signals 54 and 56). The DDC contains an NCO and a mixer which tune the desired center frequency down to DC where it is low pass filtered by filters 64, 67, 68 and 69. The NCO and mixers quadrature down convert the signal to baseband, and are followed by five stage Cascade Integrate Comb (CIC) filter 64, coarse gain stage 66, which allows the boosting of gain of weak signals, and two stages of decimate by two filtering 67 and 68 to isolate the desired signal. The signal is then sent to Resampler 69 which can increase or decrease the final output sample rate to match post-processing requirements for baud rate sampling or oversampling. The output of this processing channel 60 is a baseband signal 71 including I and Q components that may be further processed by DSP 20

Figure 4:
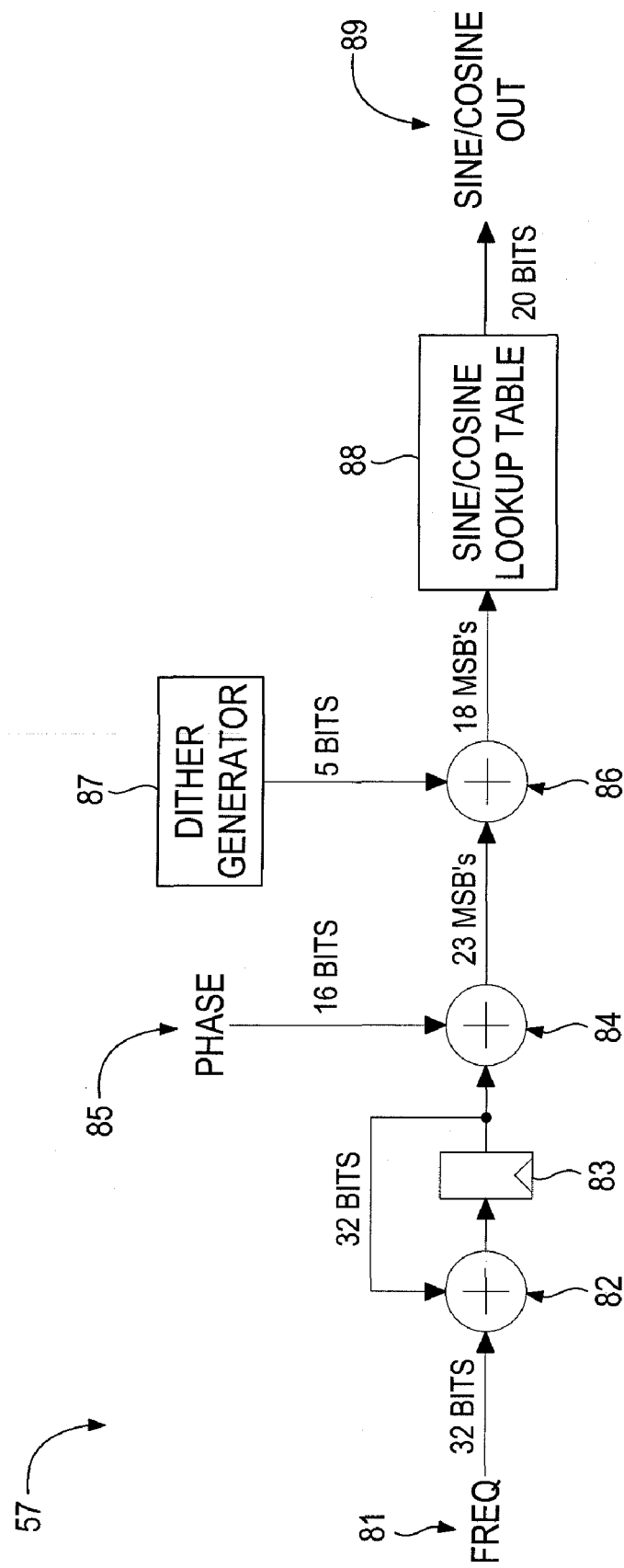

As noted previously, the DSP 20 monitors the frequency of the transmitter 10 from signal 54. Based upon the fluctuations in the frequency measurement of the transmitter 10, the DSP 20 loads a numerical value (i.e. the "tuning frequency") into registers of the NCO 57 as shown in FIG. 4. The desired frequency value 81 is input into the NCO circuit 57 and the desired phase offset value 85 is input at 84. The tuning frequency is set to FREQ 81 according to the formula $FREQ=2^{32}F/F_{CK}$, where F is the desired tuning frequency and $F_{CK}$ is the chip's clock rate. The 16 bit phase offset setting 85 is set to $PHASE=2^{16}P/2\pi$, where P is the desired phase in radians ranging between 0 and $2\pi$. Preferably, the frequency of transmitter 10, relative to the current tuning of the digital STALO 36 (or its equivalent tuning in digital space) is estimated as often as required (up to a maximum of once per transmitted pulse) to provide sufficient accuracy to keep the transmitter IF signal well within the receiver pass-band specifications to achieve effective baseband processing. The digital COHO—effected in the digital receiver by a mathematical conversion of the signal energy to a base-band IF—is thus adjusted to compensate for transmitter frequency drift via values 81 and 85 to produce a signal 89 that is mixed with input signal 59 at 62a and 62b in circuit 60 (see FIG. 3).

This process avoids the transient frequency and phase fluctuations in the STALO or COHO oscillators (produced in the typical synthesized or phase-lock-loop systems), since the digital mathematical conversion of the IF frequency to the base-band frequency has no instabilities, but is simply an exact frequency change without transients. As a result, a digital receiver exhibits superior performance in clutter discrimination as compared to systems using conventional STALO and COHO techniques.

While the invention has been shown in embodiments described herein, it will be obvious to those skilled in the art that the invention is not so limited but may be modified with various changes that are still within the spirit of the invention.

Having set forth the nature of the invention, what is claimed is:

1. In a weather radar system having a transmission source, a signal port for extracting a reference transmission signal from said transmission source and a receiver circuit for receiving reflectivity signals for processing, a transmission frequency fluctuation compensating circuit comprising:
   a. a stable local oscillator wherein said stable local oscillator is established at a single, non-fluctuating frequency;
   b. a mixer for mixing the output of said stable local oscillator with said received reflectivity signal to form an intermediate frequency reflectivity signal;
   c. a mixer for mixing the output of said stable local oscillator with the reference transmission signal to form an intermediate frequency transmission signal;
   d. an intermediate frequency digitizer for digitizing said intermediate frequency reflectivity signal and said intermediate frequency transmission signal;
   e. a signal processing module for converting said digitized intermediate frequency reflectivity signal into in phase and quadrature signals; and
   f. wherein said signal processing module includes a digital down converter circuit configured to alter said digitized intermediate frequency reflectivity signal to compensate for transmission signal frequency fluctuations.

2. The transmission frequency fluctuation compensating circuit of claim 1 wherein said digital down converter circuit includes a numerically controlled oscillator circuit configured to receive a tuning frequency and a phase offset.

3. The transmission frequency fluctuation compensating circuit of claim 2 wherein said signal processing module is configured to provide said tuning frequency to said numerically controlled oscillator circuit at a frequency representative of said digitized intermediate frequency transmission signal.

4. The transmission frequency fluctuation compensating circuit of claim 3 wherein said numerically controlled oscillator circuit output is mixed with said digitized intermediate frequency reflectivity signal to form a baseband frequency signal and wherein said digital down converter circuit includes filters to refine said baseband frequency signal.

5. The transmission frequency fluctuation compensating circuit of claim 4 wherein said digital down converter circuit includes a resampler for yielding an in phase and quadrature signal.

6. The transmission frequency fluctuation compensating circuit of claim 5 wherein said compensation circuit includes a plurality of said digital down converter circuits for wideband down converting.

7. The transmission frequency fluctuation compensating circuit of claim 2 wherein said compensation circuit includes a plurality of said digital down converter circuits for wideband down converting.

8. The transmission frequency fluctuation compensating circuit of claim 2 wherein said numerically controlled oscillator circuit output is mixed with said digitized intermediate frequency reflectivity signal to form a baseband frequency signal and wherein said digital down converter circuit includes filters to refine said baseband frequency signal.

9. An apparatus for compensating for transmission frequency fluctuation in a weather radar system having a transmission source, a signal port for extracting a reference transmission signal from said transmission source and a receiver circuit for receiving reflectivity signals for processing, comprising:
   a. means for providing a stable, non-adjustable oscillation signal;
   b. means for mixing said received reflectivity signal with said oscillation signal to form an intermediate frequency reflectivity signal;
   c. means for mixing said reference transmission signal with said oscillation signal to form an intermediate frequency transmission signal;
   d. means for digitizing said intermediate frequency reflectivity signal and said intermediate frequency transmission signal; and
   e. means for processing said digitized intermediate frequency reflectivity signal into in phase and quadrature signals, wherein said processing means includes a digital down converter circuit responsive to said transmission source for compensating for transmission signal frequency fluctuations.

10. The device of claim 9 wherein said digital down converter circuit includes a numerically controlled oscillator circuit configured to receive a tuning frequency and a phase offset.

11. The device of claim 10 wherein said processing means are configured to provide said tuning frequency to said numerically controlled oscillator circuit at a frequency representative of said digitized intermediate frequency transmission signal.

12. The device of claim 11 wherein said numerically controlled oscillator circuit output is mixed with said digitized intermediate frequency reflectivity signal to form a baseband frequency signal and wherein said digital down converter circuit includes filtering means to refine said baseband frequency signal.

13. The device of claim 12 wherein said digital down converter circuit includes resampling means for yielding in phase and quadrature signals.

14. The device of claim 13 wherein said processing means include a plurality of said digital down converter circuits for wideband down converting.

15. The device of claim 10 wherein said processing means include a plurality of said digital down converter circuits for wideband down converting.

16. The device of claim 10 wherein said numerically controlled oscillator circuit output is mixed with said digitized intermediate frequency reflectivity signal to form a baseband frequency signal and wherein said digital down converter circuit includes filtering means to refine said baseband frequency signal.

17. In a weather radar system having a transmission source, a signal port for extracting a reference transmission signal from said transmission source and a receiver circuit for receiving reflectivity signals for processing, a transmission frequency fluctuation compensation method comprising the steps of:
   a. sampling a transmission signal at said signal port;
   b. receiving a radar reflectivity signal;
   c. generating a stable local oscillator signal having a single, non-fluctuating frequency;
   d. mixing said reflectivity signal with said oscillator signal to produce an intermediate frequency reflectivity signal;
   e. mixing said transmission signal with said oscillator signal to produce an intermediate frequency transmission signal;
   f. digitizing said intermediate frequency reflectivity signal and said intermediate frequency transmission signal; and
   g. configuring a signal processing module to convert said digitized intermediate frequency reflectivity signals into in phase and quadrature signals; and
   h. wherein said step of configuring said signal processing module includes configuring a digital down converter circuit in response to reception of said digitized intermediate frequency transmission signal to compensate for transmission signal frequency fluctuations.

18. The method of claim 17 wherein said step of configuring said signal processing module further comprises the step of configuring a numerically controlled oscillator circuit to receive a tuning frequency and a phase offset.

19. The method of claim 18 wherein said step of configuring said signal processing module further comprises the step of configuring said signal processing module to provide said tuning frequency to said numerically controlled oscillator circuit at a frequency representative of said digitized intermediate frequency transmission signal.

20. The method of claim 19 wherein said step of configuring said signal processing module further comprises the steps of mixing the output of said numerically controlled oscillator circuit with said digitized intermediate frequency reflectivity signal to form a baseband frequency signal and filtering said baseband frequency signal to refine it.

21. The method of claim 20 wherein said step of configuring said signal processing module further comprises the step of resampling said baseband frequency signal to yield an in phase and quadrature signal.

22. The method of claim 21 wherein said step of configuring said signal processing module further comprises the step of configuring a plurality of digital down converter circuits for wideband downconverting.

23. The method of claim 18 wherein said step of configuring said signal processing module further comprises the step of configuring a plurality of digital down converter circuits for wideband downconverting.

24. The method of claim 18 wherein said step of configuring said signal processing module further comprises the steps of mixing the output of said numerically controlled oscillator circuit with said digitized intermediate frequency reflectivity signal to form a baseband frequency signal and filtering said baseband frequency signal to refine it.

25. The method of claim 24 wherein said step of configuring said signal processing module further comprises the step of configuring a plurality of digital down converter circuits for wideband downconverting.

* * * * *